US012799957B2

(12) United States Patent
Lvov et al.

(10) Patent No.: US 12,799,957 B2
(45) Date of Patent: Nov. 17, 2026

(54) METHOD FOR BRAKING A SUPERSONIC GAS FLOW

(71) Applicants: Denis Ernestovich Lvov, Saint-Petersburg (RU); Timofei Aleksandrovich Doronin, Bykovo (RU); Aleksei Dmitrievich Golubev, Vsevolozhsk (RU)

(72) Inventors: Denis Ernestovich Lvov, Saint-Petersburg (RU); Timofei Aleksandrovich Doronin, Bykovo (RU); Aleksei Dmitrievich Golubev, Vsevolozhsk (RU)

( * ) Notice: Subject to any disclaimer, the term of this patent is extended or adjusted under 35 U.S.C. 154(b) by 188 days.

(21) Appl. No.: 18/863,991

(22) PCT Filed: May 11, 2022

(86) PCT No.: PCT/RU2022/000156
§ 371 (c)(1),
(2) Date: Nov. 7, 2024

(87) PCT Pub. No.: WO2023/219527
PCT Pub. Date: Nov. 16, 2023

(65) Prior Publication Data

US 2026/0251162 A1 Aug. 27, 2026

(51) Int. Cl.

| | |
|---|---|
| ***F15D 1/08*** | (2006.01) |
| ***B05B 1/26*** | (2006.01) |
| ***F15D 1/00*** | (2006.01) |

(52) U.S. Cl.
CPC .................. *F15D 1/08* (2013.01); *B05B 1/26* (2013.01); *F15D 1/0005* (2013.01)

(58) Field of Classification Search
CPC . F15D 1/08; F15D 1/0005; B05B 1/26; B05B 1/267
USPC ................................. 239/461, 499, 504, 589
See application file for complete search history.

(56) References Cited

U.S. PATENT DOCUMENTS

| | | | | |
|---|---|---|---|---|
| 7,721,811 B2 * | 5/2010 | Reilly | A62C 99/0072 239/518 |
| 9,163,892 B1 * | 10/2015 | Buboltz | F41A 21/28 |
| 2015/0321314 A1 * | 11/2015 | Lee | B24C 1/003 239/589 |

* cited by examiner

*Primary Examiner* — Steven J Ganey
(74) *Attorney, Agent, or Firm* — Aird & Berlis LLP

(57) ABSTRACT

A method for braking a supersonic gas flow can be used for braking supersonic gas flows containing particles that move coaxially with the gas flow but are not homogeneous therewith, such as inclusions in the form of a solid, liquid, plasma or similar body or bodies, with the gas flow acting as a carrier flow therefor. The present method is intended for braking the gas component of a supersonic carrier flow and subsequently separating, recovering or performing similar actions with respect to the inclusions or particles moving separately in said flow and being transported coaxially therewith in the gas flow. The inclusions or particles may be of various types, for example solid particles, a liquid that later separates into drops, a plasma, or other sorts of inclusions.

2 Claims, 5 Drawing Sheets

METHOD FOR BRAKING A SUPERSONIC GAS FLOW

FIELD OF APPLICATION

Figure 1A:
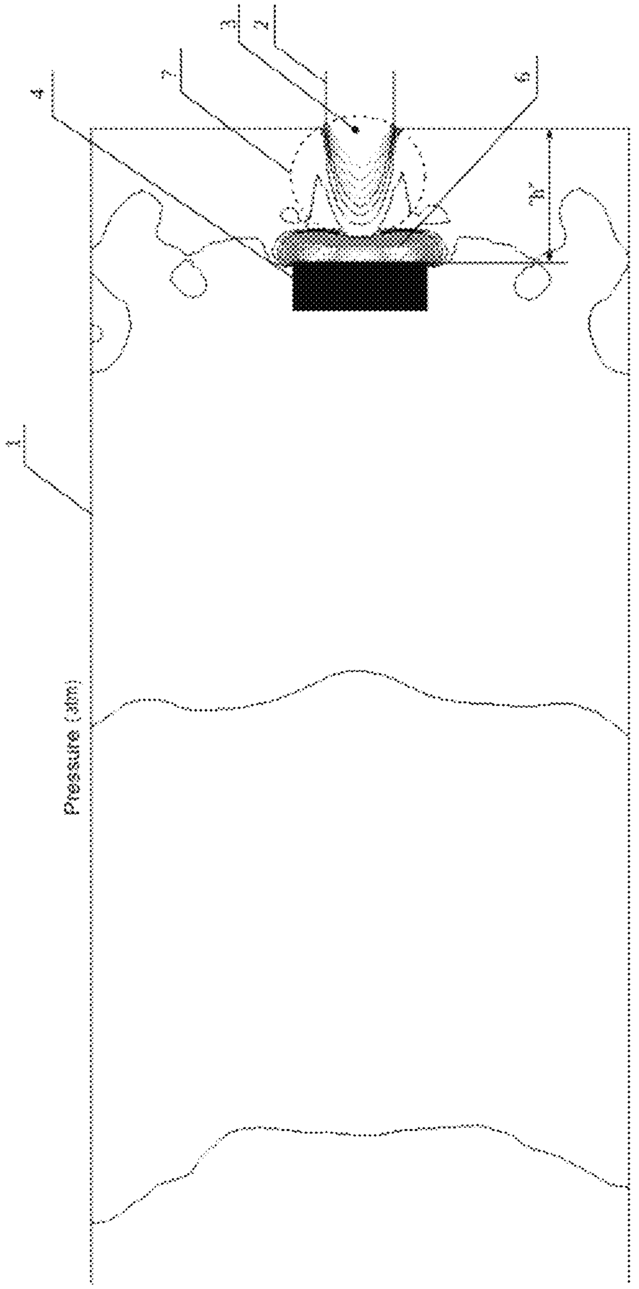

The supersonic gas flow deceleration method can be used to decelerate supersonic gas flows containing particles coaxially moving together with the gas flow that are not homogeneous to the gas flow, for example, inclusions that are solid, liquid, plasma, and the like body or bodies. In this case, the gas flow acts as their carrier flow.

PURPOSE

This method is intended for decelerating the gas component of a carrier supersonic flow and for subsequent separation, recuperation, and similar actions concerning inclusions or particles moving separately in this flow and carried in this gas flow coaxially with it. The inclusions or particles may be diverse, for example, solid particles, liquid that is further divided into droplets, plasma, or other types of inclusions.

PRIOR ART

The utility model "A Silencer for Pneumatic Weapons" is known from the prior art, patent RU 206 121, published on Aug. 24, 2021, IPC F41A 21/30, which contains an expansion chamber with an elastic element installed inside. The latter is located partially on the sleeve extending inside the expansion chamber and rigidly fixed in the outlet end of the expansion chamber coaxially to the barrel of the weapon. At the same time, the outer dimensions of the elastic element are smaller than the inner size of the expansion chamber. The silencer is used for pneumatic weapons and rules out the blowout of the elastic element from the expansion chamber. However, this silencer does not operate with supersonic gas flows or utilize the shock wave phenomenon.

The invention "A Method for Purifying Gases from Impurities" is known, patent RU2 757 240, IPC F25J3/06, B01D53/00, B01D7/02, published on Oct. 12, 2021, which uses the supply of an initial gas flow for gas purification with the simultaneous supply of a flow of solid particles into the supersonic nozzle and the gas expansion with cooling while it flows at a supersonic velocity. It allows for the controlled condensation of the vapors present in the gas with the desublimation of the extracted components. However, the separation of gas and solid phases requires it to be carried out at temperatures well below the ambient temperature and the subsequent use of a cyclotron to separate solid and gas particles. In this case, there is no destruction of the homogeneity of the gas flow density distribution over the cross-section directly when the gas with particles flows out.

The invention "A Method for Spraying a Coating on a Product Made of Natural Stone or Metal Material" is known, patent RU2489519, IPC C23C24/04, B05B7/14, B44C3/02, B82B1/00, published on Aug. 10, 2013, which allows fragmentation of particles with a size of 5-200 microns and aggregation of several highly dispersed particles with a size of 0.03-4.99 microns due to the formation of a gas and powder flow with its acceleration to a supersonic flow, in which a gas and powder flow is formed that is additionally subjected to shock mechanical activation upon collision with a partially shielding barrier. This destroys the homogeneity of the gas flow density distribution over the gas flow cross-section. However, the method is too complex and is used for spraying coatings on surfaces of products by cold gas-dynamic spraying, including on surfaces of art products and three-dimensional configurations. It does not allow for the deceleration of the gas component of the supersonic gas flow without a significant impact on the velocity of the flow of bodies moving coaxially and together with the gas flow.

In the traditional method of gas flow deceleration in labyrinth-type devices, the carrier gas and the bodies entrained by it are decelerated in the same way. At the outlet, the gas component of the flow and the moving particles will have the same velocity, which makes it difficult to separate these particles further.

The traditional method of flow deceleration in tunnel-type devices requires a large-scale tunnel, both in length and in diameter. This is conditioned by the fact that starting the flow into a long tube requires a larger diameter than the diameter of the flow itself.

A method is also known for decelerating a supersonic flow using a straight shock wave, which is generated in a gas mixture on (in front of) solid transverse partitions where all flow components, both inclusions and the gas component, are decelerated. This prevents the bodies (inclusions) entrained by the flow from holding on their way. However, for example, for a recuperation task, it is impossible to ensure the movement of these inclusions downstream of the partition without the gas component of the flow, using, for example, the effect of gravity acting on these particles (inclusions).

In the known cyclone flow separation method, the effect of the difference between the inert masses constituting the mixed flow is used, rather than selective reduction in their velocities.

By the foregoing, the supersonic gas flow deceleration methods known from the prior art and devices of known types will either not apply to the case of deceleration of a gas flow with inhomogeneous inclusions, or will not give the efficiency they could feature.

Furthermore, the disadvantages of the known designs include their weight and size characteristics that are far from desirable for real structures.

The invention "A Recoil Control for an Artillery Gun" is known, patent RU2766 237, IPC F41A21/36, F41A 21/32, published on Feb. 10, 2022, in which there is a parabolic structure divided internally by load-bearing partitions into four sectors, each of which has expansion chambers with windows having front vertical walls in front. It reduces the gas pressure and shock sound load and increases the recoil braking forces. Pascal's law is used, according to which in a closed cavity the gas pressure in all directions is the same, so the gas flow is redirected and the outflow of gases from the barrel reduces the primary pressure at the outlet through the muzzle face. However, a straight shock wave is not used; therefore, it does not provide deceleration of the gas component of the supersonic gas flow without a significant effect on the velocities of bodies moving with the flow, in this case, the projectile.

The closest to the proposed technical solution is the invention "A Muzzle Brake (MB)," patent RU 2 744 219, IPC F41A 21/36, F41A 21/30, published on Mar. 3, 2021, featuring a tubular nozzle, in which the holes in the working zones of the chambers are placed so that when installed on the weapon barrel end they are oriented perpendicular to the axis of the barrel. The muzzle brake is used to reduce the reactive component of gases. It allows for reducing or eliminating the recoil on firing. However, it does not ensure the destruction of the homogeneity of the gas flow density distribution over the cross-section with an increase in density from the center to the periphery of the gas flow.

Inventive Problem

It is known from the gas dynamics that the most effective way to decelerate a supersonic gas jet is to arrange the conditions under which a shock wave is formed on the way of this jet. For example, a shock wave will be formed when a supersonic jet runs into a flat barrier. However, there are cases when such a solid barrier cannot be made, in particular, when, together with a gas jet, for example, in its central part, a body or bodies follows, for which it is required to ensure unhindered straight passage, while the gas flow entraining these bodies, in which the bodies move, should be decelerated as much as possible and separated. Due to this effect, the gas is decelerated and dissipated, and the inclusions (bodies) move further at a predetermined velocity.

A shock wave is understood as a relatively narrow area, in fact, a flow break zone, where the pressure and temperature in the gas flowing at a supersonic velocity increase sharply and the gas moving velocity drops below the velocity of sound, and the gas flow is decelerated.

It is also known from the gas dynamics that if two or more obstacles are arranged especially near each other, then with certain geometric ratios of the sizes of these obstacles and the distances between them, boundaries of deceleration zones created by these obstacles in the gas flow from high-pressure zones at each obstacle and these zones can come into contact. In the design case, one common shock wave is formed in the gas flow upstream of a group of such obstacles, similar to the shock wave that would occur in the gas flow in the case of the location of one obstacle made as a whole from this group of obstacles. In this case, the problem of ensuring unimpeded rectilinear passage of inclusions entrained by this flow will be solved.

TECHNICAL RESULT

The proposed technical solution provides the following technical result:

- deceleration of the gas component of a supersonic gas flow without a significant impact on the velocity of the flow of bodies moving coaxially and together with the gas flow;
- destruction of the homogeneity of the gas flow density distribution over the cross-section with an increase in density from the center to the periphery of the gas flow.

EMBODIMENT OF THE INVENTION

The technical result is achieved since the method of deceleration of a supersonic gas flow is implemented includes the placement of a breaker washer perpendicular to the supersonic gas flow and coaxial to its axis in a housing, the passage of a part of the supersonic flow through the breaker washer through-hole with the possible passage of a body or bodies being foreign to the main gas flow and moving coaxially with the flow through the breaker washer through-hole, a shock wave is formed upstream of the breaker washer in the approaching gas flow that breaks the supersonic flow of gas particles in this gas flow due to the ratio of geometric dimensions “d” and “D” of the breaker washer. New in the method is that the housing is placed downstream of the end of the supersonic flow source channel, forming a through channel, due to the tubular-shaped housing, at least one working zone placed coaxially to the source channel is formed or several working zones placed in series and coaxially to the source channel are formed, for which the breaker washer is placed in the working zone coaxially to the through channel, providing the distance “h” between the end of the channel and the breaker washer or neighboring breaker washers, having a value not less than half of the diameter “d” of the through a hole in the breaker washer, and to form a shock wave upstream of the breaker washer, the breaker washer is made with the outer diameter “D” numerically equal to not less than 2 diameters of the hole “d” in the breaker washer. In this case, the working zone “a” is formed when the supersonic gas flow runs onto the breaker washer with the simultaneous creation of an obstacle to the gas reflection of the approaching gas flow ensuring the formation of a shock wave in the space in front of the breaker washer in the approaching supersonic gas flow. The distance “h” between the channel end and the breaker washer or neighboring breaker washers is calculated based on the difference of pressures inside and outside the gas flow, as well as the velocity, density, viscosity, and temperature of the outflowing gas, and this distance is equal to at least half of the hole diameter “d”. In a particular case, the length of each working zone is formed not less than half the breaker washer hole diameter “d”.

In the proposed method, the deceleration of the supersonic gas flow is implemented by fulfilling the conditions for the occurrence of a shock wave blocking the hole for the flow of bodies moving coaxially with the gas flow. The shock wave is formed (created) using installing obstacles at a design distance sufficient to enable the shock wave formation in front of each obstacle referred to as the Mach disk. Arrangement of the design distance of at least half the diameter of the hole from which the gas flow with inclusions outflows and equal to the distance from the border of this hole to a special obstacle placed in the path of the gas flow. For example, a flat washer or a series of washers with an outer diameter of at least two diameters of the washer through-hole are used as a special obstacle. These washers are referred to herein as breaker washers. Then, as a result of the interaction of the gas flow with inclusions with parts of this obstacle, a common shock wave will be formed in the gas flow running onto the obstacle that blocks the central through hole of the special obstacle (breaker washer), which will lead to deceleration of the gas flow. At the same time, the possibility of unobstructed straight movement of the body (bodies) moving coaxially with the gas flow will be preserved.

The body can be either a single body discharged from the source channel into the through channel of the housing, or a mass of particles, for example, sand, shot, or droplets in a liquid jet.

The proposed design is illustrated by drawings that do not cover all embodiments.

Figure 1B:
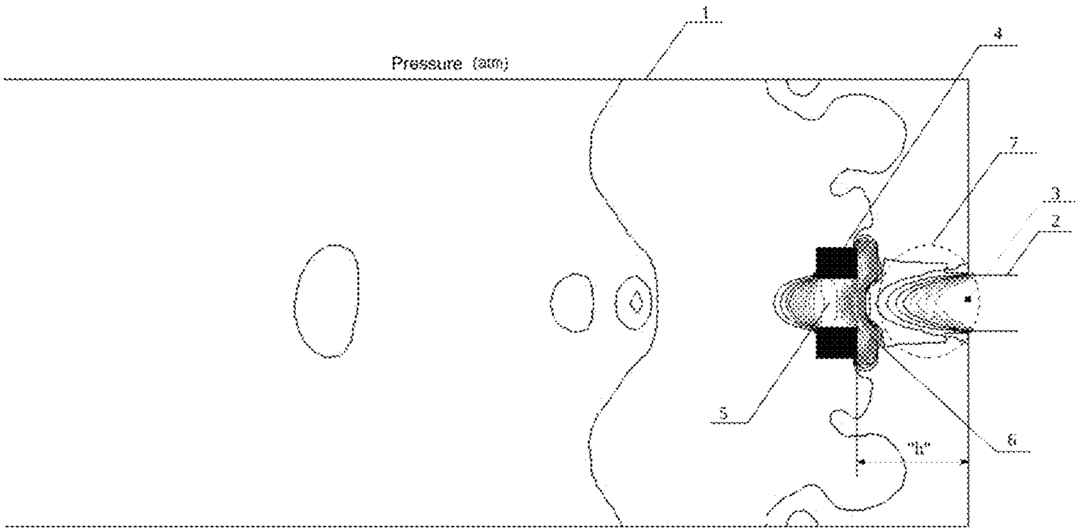
Figure 1C:
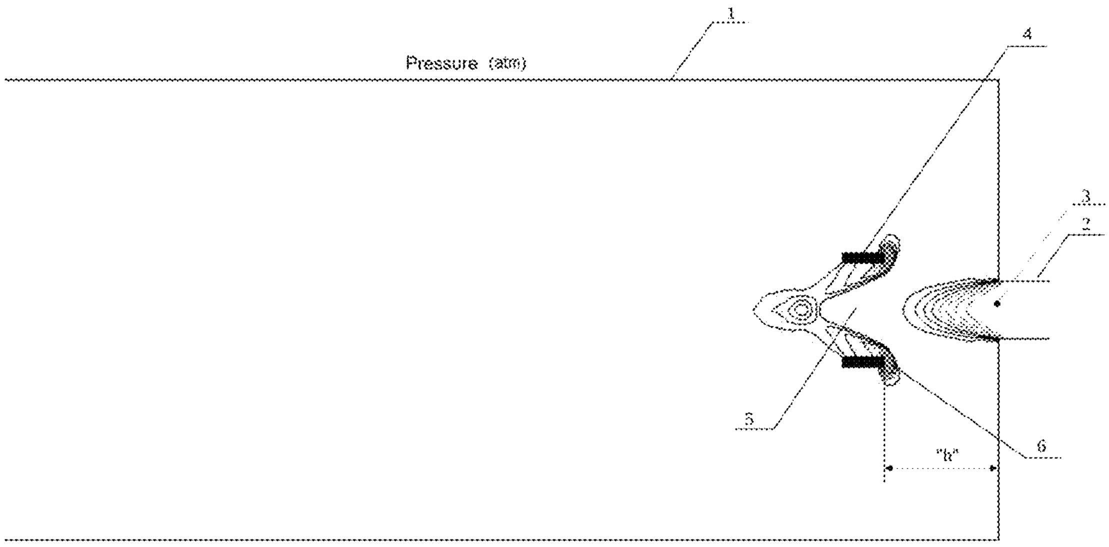

FIG. 1 shows the results of computer simulation of the pressure distribution of velocity and pressure fields for cases of supersonic gas jet interaction: a) with a solid obstacle in the form of a disk; b) with an obstacle in the form of a washer, the geometry of which is designed in compliance with the condition described above; c) with an obstacle in the form of a washer, the geometry of which is designed without observing the condition described above (here, the interaction of the flow with a washer, in which the hole is excessively larger than the gas flow diameter, is shown).

Figure 2A:
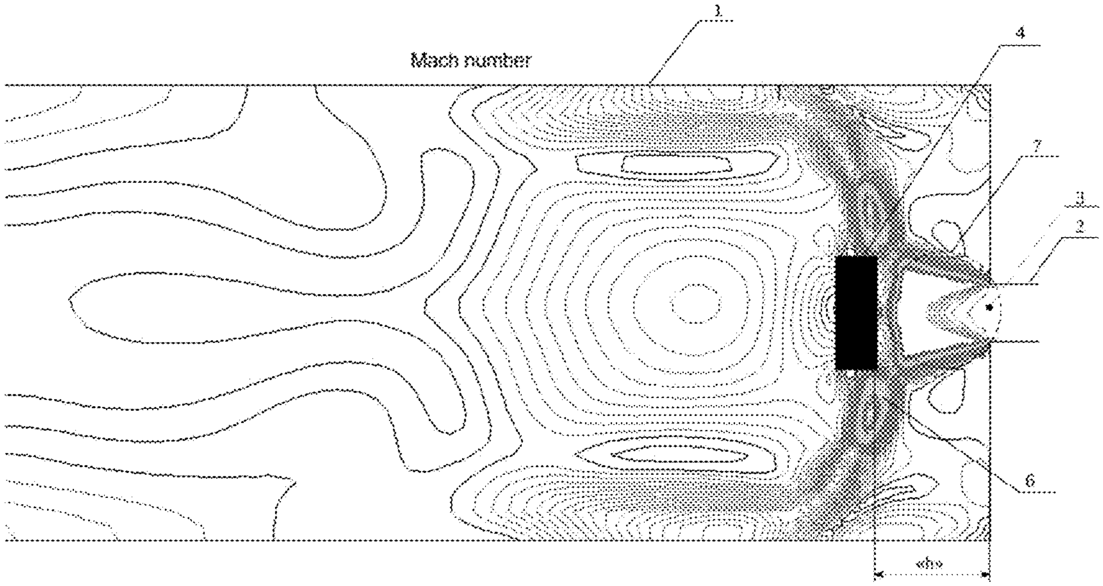
Figure 2B:
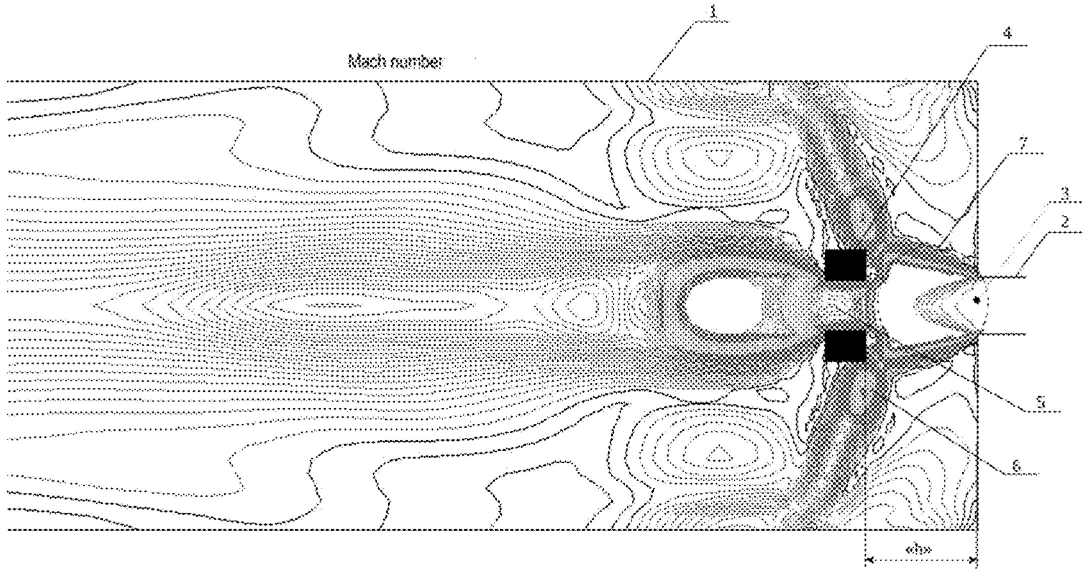
Figure 2C:
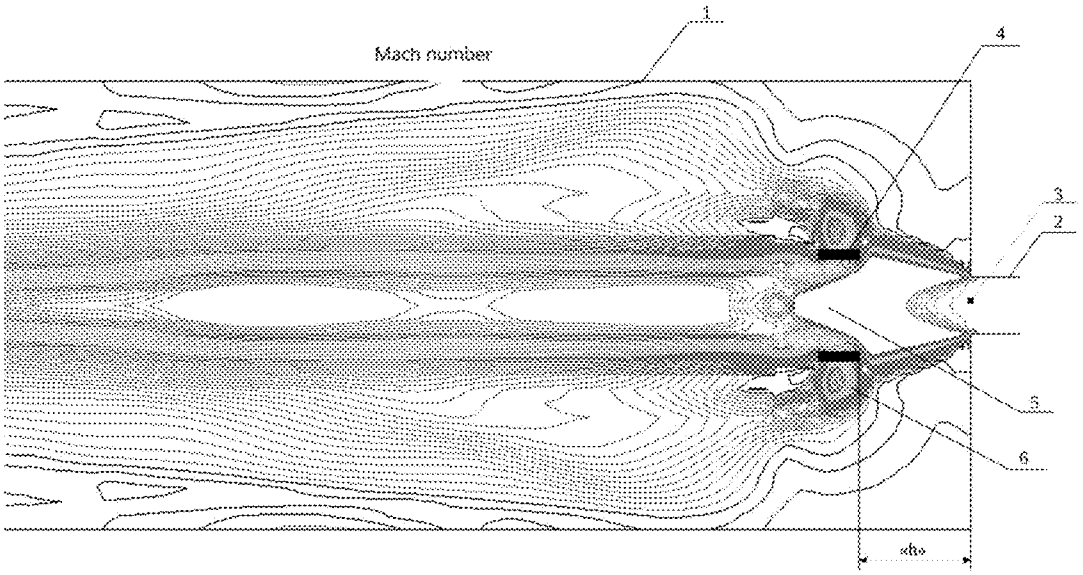

FIG. 2 shows the results of computer simulation of the velocity distribution of velocity and pressure fields for cases of supersonic gas interaction: a) with a solid obstacle in the form of a disk; b) with an obstacle in the form of a washer, the geometry of which is designed in compliance with the condition described above; c) with an obstacle in the form of a washer, the geometry of which is designed without observing the condition described above (here, the interaction of the flow with a washer, in which the hole is excessively larger than the gas flow diameter, is shown).

Figure 3:
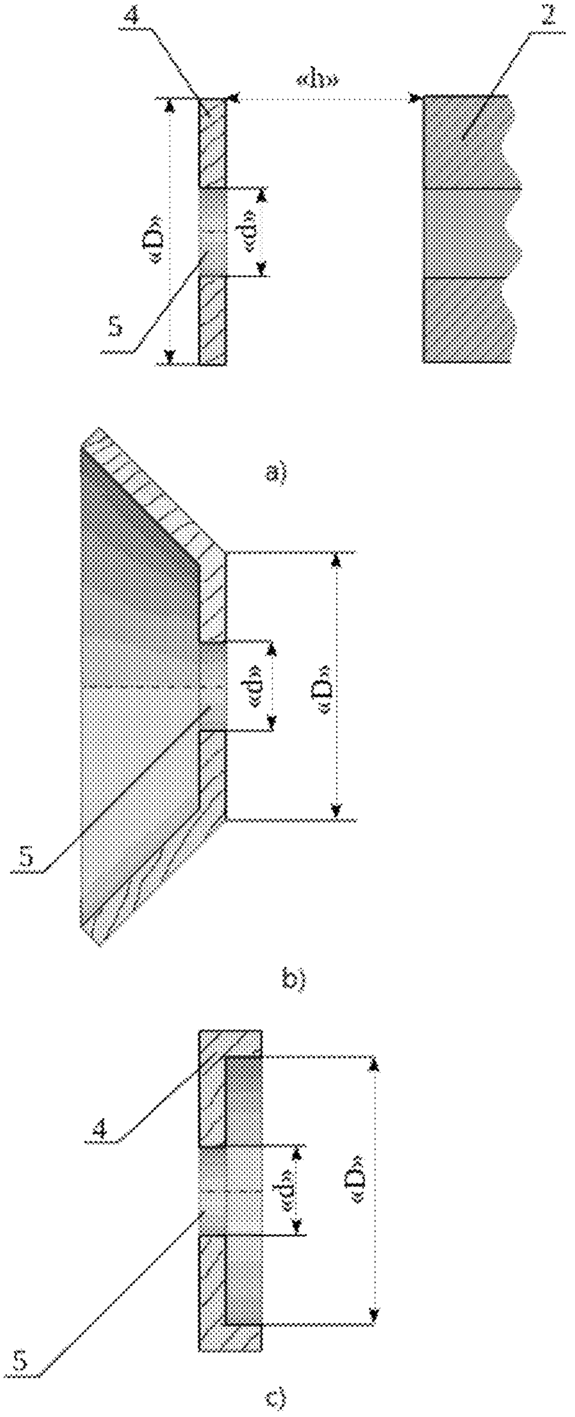

FIG. 3 shows the breaker washers: a) flat; b) cone-shaped; c) cup-shaped.

IMPLEMENTATION OF THE METHOD

A design implementing this method of decelerating a supersonic gas flow can be made as follows. In a cylindrical housing (1) made, for example, in the form of a tubular nozzle, there is an inlet channel (source channel) (2) having an opening (3) from which a supersonic gas flow with inclusions flows out, and at least one special obstacle is placed, made as a breaker washer (4). The breaker washer (4) is located in the housing (1) perpendicular to the supersonic gas flow and coaxial to its axis; it has a through-hole (5) for passage of the body (or bodies) moving coaxially with the gas flow. In this case, the ratio of the geometric dimensions of the breaker washer:hole diameter "d" and breaker washer (4) diameter "D," and the distance "h" to it ensures the formation of a shock wave (6) in front of it in the approaching gas flow that breaks its supersonic flow. The shock wave (6) creates one working zone "a" (7) located coaxially with the source channel (2) and the housing (1). Several such working zones can be arranged in series and coaxially by placing several breaker washers (4) in series. The distance "h" between the end (the hole) (3) of the source channel (2) and the breaker washer (4), or two adjacent breaker washers (4) is calculated based on the pressure difference inside the gas flow and outside it, as well as the velocity, density, viscosity, and temperature of the outflowing gas; it is equal to at least half the diameter of the through-hole "d" in the corresponding breaker washer (4). The breaker washer through-hole "d" is intended for the unobstructed passage of a body (or bodies) moving coaxially with the gas flow. The breaker washer (4) has an outer diameter "D," numerically equal to at least 2 through-hole diameters "d". Moreover, the breaker washer can be combined with a "skirt," an additional gas guide element intended to force gas to the periphery to the wall of the housing (see FIG. 3*b*), or is equipped with gas-reflecting beads as shown in FIG. 3*c*. The breaker washer (4) can be made in various versions. Thus, FIG. 3*a* shows a washer-breaker (4) in the form of a flat part, FIG. 3*b* shows a breaker washer in the form of a conical bowl, and FIG. 3*c* shows a breaker washer of a disk type. The shape of the breaker washer continuation does not affect generating a single straight shock wave.

The proposed method is implemented as follows.

An underexpanded supersonic gas flow that outflows from the source channel (2) into the housing (1) expands and, striking against the special obstacle in the form of a breaker washer (4), compresses and forms a stable shock wave (6) in the space in front of it, which decelerates the outflowing gas flow.

The term "underexpanded supersonic gas flow" is understood as a general use term that means a flow with excess pressure relative to the environment.

As a physical phenomenon, the shock wave is described, for example, in [A. M. Mkhitaryan "Aerodynamics". M: "Mechanical Engineering," 1976.]

The effect of the shock wave is explained by the fact that when a supersonic gas flow is decelerated, when gas particles pass from the low-pressure region to the high-pressure region, a jump-like (shock) change in parameters occurs, i.e. the occurrence of a break surface called a shock wave. Break surfaces may be flat or curved and differently oriented to the direction of the velocity vector. If the break surface is normal to the flow rate, then the shock wave is called straight, otherwise, it is oblique. The shock wave is accompanied by a sharp decrease in velocity and an increase in pressure, density, and temperature with a loss of kinetic energy in the gas flow. Shock waves occur not only in a free gas flow from a jet engine nozzle into the atmosphere but also, for example, in a supersonic gas flow inside a channel.

The minimum possible distance to the obstacle "h" necessary for the gas flow to form a shock wave (6) (also called the "first barrel distance") is calculated based on the pressure difference in the inlet cross-section of the outflow point and in the outflow zone, as well as the velocity, density, viscosity, and temperature of the outflowing gas. Usually, this value cannot be less than half the diameter of the flow cross-section.

If the obstacle (4) encountered by the supersonic flow is a thin-walled ring with a wall thickness of less than half the inner diameter (see FIG. 1-2 "c"), then short rapidly absorbing oblique shock waves will form at the edges of such a ring, "resting" against which the gas flow will deflect and bend around the obstacle on both sides. However, the major portion of the gas mass in the flow will have a Gaussian distribution and will continue to move at a supersonic velocity in the central part of the flow.

If the supersonic flow runs onto the obstacle (4) in the form of a thick-walled ring (FIG. 1-2 "b"), the wall thickness of which is designed in such a way that the zones of increased pressure from the oblique shock waves formed at its edges have time to "meet" before their destruction and unite in its center (usually this occurs when the wall thickness is equal to or larger than half the inner diameter), then this leads to the formation of one large common shock wave in front of the entire face of the ring (similar to the shock wave that would be formed if the obstacle was not a ring, but a solid disk (FIG. 1-2 "a")), i.e. the flow begins to "perceive" such a ring as a single obstacle with a virtual "filler" of the hole (5) implemented by the increased pressure that obstructs the axial gas flow. As a result, the gas flow will be forced not only to decelerate but also to go around the obstacle from the outside, so that in the total flow after going around the obstacle the density is redistributed towards the peripheral regions of the flow with the density distribution law similar to the inverse Gaussian distribution law. In this case, the body (or bodies) moving coaxial to the flow and smaller than the diameter "d" can continue following in the axial direction.

All parameters can be initially calculated analytically and selected based on the results of numerical computer simulation of gas outflow using the finite element method based on the solution of the Novier-Stokes gas equations.

In addition to very effective deceleration of the flow, characterized by a high value of the coefficient of the ratio of the loss of flow velocity to the length of the deceleration distance, a side effect, as a result of the need for the flow to bend around the obstacle from the outside, will also be the destruction of the homogeneity of the gas flow density distribution over the cross-section with an increase in the density of the gas flow downstream of the obstacle from the center to its periphery, which creates additional engineering conveniences for its further diversion, deceleration, cooling, recuperation, etc. The body or bodies following along the flow axis will continue to move straight.

The field tests that were conducted demonstrated good compliance with the results of practical tests with the results of computer simulation.

The invention claimed is:

1. A supersonic gas flow deceleration method that comprises placing a breaker washer in the housing perpendicular to the supersonic gas flow and coaxial to its axis, passing a part of the supersonic flow through the through-hole of the breaker washer with the possible passage through the through-hole of the breaker washer of a body or bodies foreign to the main gas flow moving coaxially with the flow, forming a shock wave in front of the breaker washer in the incoming gas flow that breaks the supersonic flow of gas particles in this gas flow due to the ratio of the geometric dimensions of the breaker washer, the housing is placed downstream of the end of the supersonic flow source channel, forming a through channel, due to the tubular-shaped housing, at least one working zone placed coaxially to the source channel is formed or several working zones placed in series and coaxially to the source channel are formed, for which the breaker washer is placed in the working zone perpendicular to the through channel and coaxially to its axis, providing the distance "h" between the end of the channel and the breaker washer or neighboring breaker washers, having a value not less than half of the diameter "d" of the through hole in the breaker washer, and to form a shock wave upstream of the breaker washer, the breaker washer is made with the outer diameter "D" numerically equal to not less than 2 diameters of the hole "d" in the breaker washer, wherein the working area "a" is formed between the flow source channel and the shock wave formed by the attack of the supersonic gas flow on the breaker washer, which plays the role of an obstacle to the gas reflection of the incoming gas flow, the distance "h" between the end of the source channel and the breaker washer or neighboring breaker washers is calculated based on the pressure difference inside the flow and outside it, as well as the velocity, density, viscosity and temperature of the outflowing gas, and this distance is equal to at least half the diameter of the hole "d".

2. A supersonic gas flow deceleration method according to claim 1, is characterized in that a length of each working zone of at least half the diameter of the hole "d" of the breaker washer is formed.

* * * * *